May 18, 1943  B. F. MIESSNER  2,319,622
PHONOGRAPHIC PICKUP DEVICE
Filed Nov. 8, 1940
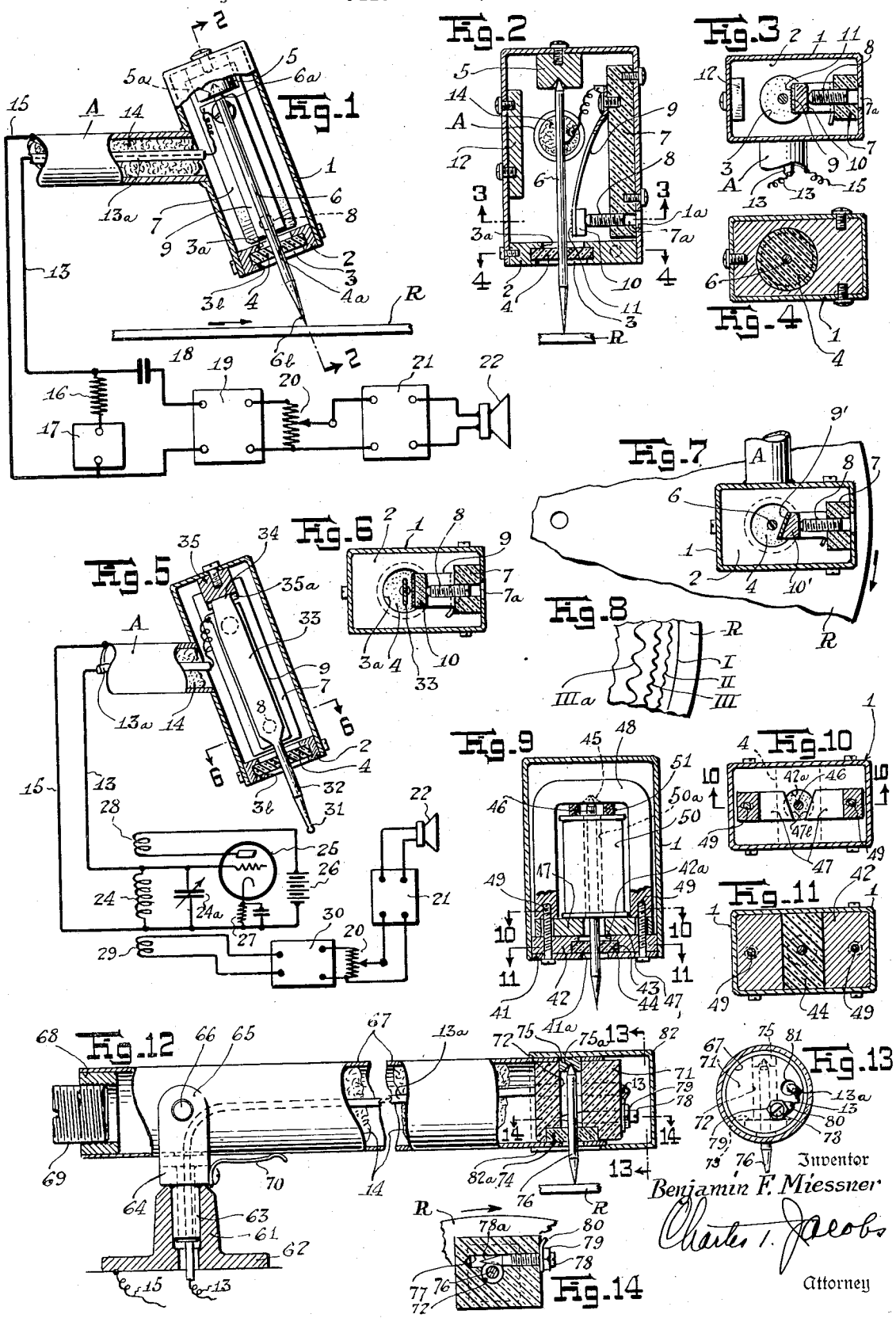
Inventor
Benjamin F. Miessner
Charles I. Jacobs
Attorney Patented May 18, 1943

2,319,622

UNITED STATES PATENT OFFICE 2,319,622

PHONOGRAPHIC PICKUP DEVICE

Benjamin F. Miessner, Harding Township, Morris County, N. J., assignor to Miessner Inventions, Inc., Millburn Township, Essex County, N. J., a corporation of New Jersey Application November 8, 1940, Serial No. 364,807

15 Claims. (Cl. 179—100.41)

This invention relates to phonographic reproduction, and more particularly to the picking up of electrical oscillations from an undulating record groove. By way of preferred example, the invention has been illustrated and described with reference to grooves undulating laterally, or in the plane of the record surface, but it is to be understood that no unnecessary limitation thereto is intended.

It is an object of the invention to provide a generally improved pick-up device.

It is an object to provide a pick-up device characterized by extreme simplicity It is an object to provide a pick-up device characterized by extreme lightness. And it is an object to provide a pick-up device characterized by extreme ruggedness.

It is an object to provide a pick-up device which operates satisfactorily with a very low pressure of its needle or other stylus against the record.

It is an object to provide a pick-up device from which there are eliminated, in especially large measure, spurious resonances and other characteristics detrimental to the faithfulness of the reproduction.

It is an object to provide, in a pick-up device, a positive-acting but extremely simple stylus-retaining means.

It is an object to provide novel means and methods for effecting a volume expansion in the reproduction—i. e., an increase of contrast between the amplitude levels reproduced from passages which have been respectively recorded at low and high volume levels.

It is an object to provide means and methods for effecting such volume expansion wholly within the pick-up device And it is an object to provide an improved pick-up device wherein such volume expansion is effected.

Other and allied objects will more fully appear from the following description and the appended claims.

In the description reference is had to the accompanying drawing, in which

Figure 1 is a view, partly elevational and partly cross-sectional, of a pick-up device in which my invention has been embodied in one form, together with a schematic diagram of certain associated apparatus;

Figure 2 is a cross-sectional view taken along the line 2—2 of Figure 1 (the line 1—1 in Figure 2 indicating the line along which the cross-sectional portions of Figure 1 are taken);

Figure 3 is a cross-sectional view taken along the line 3—3 of Figure 2;

Figure 4 is a cross-sectional view taken along the line 4—4 of Figure 2;

Figure 5 is a view generally similar to Figure 1 but illustrating the embodiment of my invention in a modified form;

Figure 6 is a cross-sectional view taken along the line 6—6 of Figure 5;

Figure 7 is a cross-sectional view of a pick-up device generally similar to that of Figures 1 through 4 but incorporating a particular feature of modification therefrom (the line 7—7 in Figure 2 indicating the general plane of the illustration of Figure 7);

Figure 8 is a fragmentary view of a record showing three typical grooves in greatly enlarged scale;

Figure 9 is a cross-sectional view, taken on a plane corresponding to that on which Figure 2 is taken, of a pick-up device in which may invention has been embodied in another form;

Figure 10 is a cross-sectional view taken along the line 10—10 of Figure 9;

Figure 11 is a cross-sectional view taken along the line 11—11 of Figure 9;

Figure 12 is a view, partly elevational and partly cross-sectional, of a pick-up device in which my invention has been incorporated in still another form;

Figure 13 is a cross-sectional view taken along the line 13—13 of Figure 12; and Figure 14 is a cross-sectional view taken along the line 14—14 of Figure 12.

For convenience in describing the several pick-up devices in which I have illustrated respective embodiments of my invention, each may be considered as comprising a vibratable or "armature" system subjected to vibration by the undulations of the record groove (which will be understood to be moved relatively to the pick-up device), and a translating system responsive to that vibration and serving to translate it into electric oscillations. The translating system may, for example, have a sensitive portion in relatively close spaced relationship to the armature, the vibration of the armature serving to oscillatorily vary this spaced relationship and so to influence the translating system. In another view, the translating system may have a field, for example electrostatic or electromagnetic, in which the armature vibrates, the resulting oscillatory alteration of the field giving rise to the desired electric oscillations.

A feature of preferred embodiments of my invention in the employment for the armature system of a unitary member—by which I mean to denote a member comprising either a single integral element, or a plurality of elements rigidly and permanently secured together. This feature limits to the greatest possible extent the chances for spurious resonances; there is only the one member in which such resonances can possibly occur, and this is readily arranged to suppress them effectively and/or to remove their frequency outside of the range of audibility. This feature further makes possible the complete elimination of loose connections, lost motions, and the like, together with their deleterious effects on reproduction. I have found, for example, that a highly satisfactory pick-up device may be made involving as its entire armature system a simple needle, and such a pick-up device I have illustrated in Figures 1 through 4.

In these figures, 1 represents an inverted metallic casing, generally rectangular for example, having the closure member 2 removably secured across its otherwise open bottom. Through the bottom member 2 there is provided a relatively large hole 3, the very top portion 3a of which is made of reduced diameter to provide a shoulder. In the hole 3 there is retained a circular block 4 of resilient material. While this retention may be insured in any desired manner, I have by way of example illustrated the hole 3 as formed with a slight flange 3b inwardly directed at its bottom; the block 4, compressed during insertion to pass the flange, thereafter expands to fill the hole above the flange and to be effectively retained by the latter. Through the resilient block 4, for example centrally thereof, there is provided a very small-diameter hole 4a.

The casing 1 may be secured at the front extremity of a cylindrical arm A, typically with a slight inclination to bring its bottom somewhat more forward than its top. The arm A will be understood to be supported at its rear extremity for free up-and-down and side-to-side movements of the pick-up device (as well known, and as typically illustrated in connection with the arm 67 in Figure 12).

To the inside of the top of the casing 1 there may be secured a metallic block 5; and in the bottom surface of this block, in line with the hole 4a abovementioned, there may be provided a concave conical bearing 5a. The armature system of the pick-up device comprises a needle 6 having the record-contacting point 6b at its bottom extremity and the bearing-contacting point 6a at its top extremity—the needle simply being pushed upwardly through the hole 4a until its extremity 6a engages the bearing 5a. The hole 4a is readily arranged to have a diameter sufficiently small so that the inserted needle will be securely retained against falling out, but at the same time sufficiently large so that the resistance to axial needle movement will not interfere with deliberate insertion or removal of the needle.

It will be understood that the groove undulations in the moving record (which in Figure 1 appears as R, with its direction of movement under the needle indicated by the arrow) will cause the needle to vibrate to the right and left as illustrated in Figure 2—this vibration being permitted by the resilience of the block 4. There will of course be a tendency to similar vibration of the entire pick-up device; but in view of the relatively high inertia of the latter, by far the principal vibration will be of the needle relative to the remainder of the device.

In this vibration the only possible resonance is that of the needle at its own natural frequency (as modified by certain effective parameters of the resilient block 4 in immediate contact therewith). Not only will this frequency inherently be very high, but also the tendency to excessive vibration due to this resonance is effectively damped by the block 4. For this damping action, as well as for such damping action as may be desirable on the intended vibration of the needle, it may be desirable to choose the material of the block 4 to have a significant viscous damping, as well as resilient, characteristic. As an example of an appropriate material, which I have entirely satisfactorily employed, there may be mentioned the synthetic rubber currently available as "Neoprene."

The translating system which I have illustrated in the device of Figures 1 through 4 is an electrostatic one, basically comprising an operatively stationary electrode in spaced relationship to the needle or armature 6—the latter constituting a vibratory electrode which with the stationary one forms an oscillatorily variable capacity. As a mounting for the stationary electrode there may be secured to the inside surface of the righthand side of the casing 1 a block 7 of insulating material (such for example as the phenol-resin composition known as "Bakelite"), which may extend very nearly down to the bottom member 2. Just above the bottom of this block 7 there may be provided a horizontal threaded hole 7a extending in a side-to-side direction through the block, and accessible from outside the casing by virtue of an aligned, slightly larger-diameter hole 1a provided in the casing. In this hole 7a, whose axis intersects the needle 6 slightly above the resilient block 4, there may be provided an adjustable screw 8. While this screw might itself be employed as the stationary electrode, I prefer to employ it only for the adjustment of that electrode, which is then made electrically independent of the screw (so that, among other things, touching of the screw with a screw-driver for adjustment purposes will not cause undue electrical disturbances). Accordingly I have shown the stationary electrode as a spring 9, having its upper extremity secured to the inner surface of block 7 near the top of the latter, extending therefrom diagonally downwardly and toward the needle, and finally curving into a lower portion essentially parallel to and near the needle. A small pad 10 of insulating material may be secured on the outer side of spring 9 opposite the end of the screw 8, and the spring 9 may be tensioned to maintain contact of this pad against that screw end. It will thus be understood that adjustment of the screw 8 will serve to adjust the spacing of the operatively stationary electrode or spring 9 from the needle, armature or vibratory electrode 6. In general, this spacing will ordinarily be adjusted to the minimum which still insures failure of contacting of the two electrodes under conditions of maximum vibration of 6.

As a precaution against those electrical disturbances which may occur if during adjustment (or at other times as a result of inapt adjustment) the electrodes come into contact with each other, there may be provided over the needle-ward surface of the spring 9 a thin coating 11 of an insulating compound, lacquer or enamel.

Preferably the arm A will be secured to the casing 1 so that its axis intersects the needle 6. This may be offset (e. g., to the left) from the center of the casing, in view of the space requirement which exists on the one side for the stationary electrode and its support, and which has no counterpart on the other side. Any tendency toward side-to-side unbalance, to such extent as troublesome, may be counteracted by a small weight member such as 12 secured against the inner surface of the lefthand side of the casing 1.

The vibratory electrode 6 is inherently electrically connected with the casing 1 and arm A, through the bearing member 5 which rests on its upper extremity; accordingly electrical connection may be made to this electrode by connection to the arm A, as through conductor 15 in Figure 1. For electrical connection to the stationary electrode 9 there may be employed a conductor 13; this may pass longitudinally through the cylindrical arm A, whose forward extremity preferably is open into the interior of the casing 1. The portion of conductor 13 within the arm A may be insulated as by the usual insulating covering 13a. Further, in order that the capacity between it and the arm may be kept both constant and at a minimum, it is preferable that it be held centrally of the arm by a packing 14 of suitable insulating fibrous material or the like.

With the translating system there may be associated electrical circuit means rendering it effective to perform its translating function. As an example of such means I have shown the translating system connected, as by conductors 13 and 15 abovementioned, in series with a resistance 16 and voltage or current source 17. This source may be operated as a high-voltage direct-current source, in which case the capacity between electrodes 6 and 9 will be charged by the source through the resistance 16. This resistance, preferably then of high ohmic value, limits the ability of the charge to change rapidly; accordingly, when the inter-electrode capacity is oscillatorily varied in accordance with the record groove undulations, the voltage across it will undergo a corresponding oscillatory variation. The oscillatory component of this voltage, which constitutes the translated oscillations, may be applied to the input of an electronic amplifier 19, whose input terminals may for example be respectively connected to conductor 15 and, through blocking condenser 18, to conductor 13. Amplified by this amplifier, the oscillations may be controlled in any desired respects (as for example in respect of volume, by potentiometer volume control 20), further amplified by amplifier 21, and translated into sound by loudspeaker 22.

The source 17 may alternatively be operated as a source of alternating current of high or super-audible frequency; it then serves to pass a current of that frequency through the serial combination of resistance 16 and the inter-electrode capacity. The amplitude of this current will be oscillatorily modulated in correspondence with the record groove undulations, as will likewise the alternating voltage appearing across the inter-electrode capacity. This modulated voltage is impressed through condenser 18 on the input of 19, which in this case is operated as a demodulator as well as an amplifier. The demodulated oscillations from 19, corresponding to the record groove undulations, proceed on to the loudspeaker as in the prior case.

In Figure 5 I have shown still another form of electrical circuit means associated with the translating system. (The translating system shown in Figure 5 has certain specific differences from that of Figure 1, as hereinafter described; but it remains a system of the electrostatic type, with output conductors 13 and 15 from an oscillatorily variable capacity as in Figure 1, and the associated electrical circuit means are interchangeable between the two figures.) In this case the conductors 13 and 15 are connected across the tuning inductance 24 of a high-frequency oscillator, across which may also be connected a small adjustable "trimming" condenser 24a for precise adjustment of desired frequency of oscillation. Purely by way of example, the oscillator has been shown as comprising a three-electrode repeater tube 25, with plate battery or other source 26 and by-passed bias resistance 27 in series with its cathode. The tuning inductance 24 may be connected between the grid of the tube and the non-cathode extremity of the bias resistance, while in the plate circuit of the tube there may be serially connected the feed-back coil 28 in inductive relation to the inductance 24. The basic operation of the oscillator, whose details are in any event only typical, will be understood and need not be described. It will be appreciated, however, that the capacity between the electrodes of the pick-up device forms a part of the tuning circuit and, accordingly, that the oscillatory variation of that capacity in correspondence with the record groove undulations will correspondingly modulate the frequency of the oscillations generated by the oscillator. The so-modulated high-frequency oscillations may be applied from the oscillator in any desired manner to the input of a system 30 designed for the amplification and demodulation of frequency-modulated oscillations, such for example as a frequency-modulation radio receiver; by way of example, this application has been shown as effected by a coil 29 coupled to the inductance 24 and electrically connected across the input terminals of the system 30. The demodulated oscillations from 30, corresponding to the record groove undulations, may be fed through control 20 and amplifier 21 to loudspeaker 22, as in Figure 1.

In Figures 5 and 6, independently of the modified associated electrical circuit means just described, I have illustrated a typical modification of my invention in respect of the armature system. This modification is adapted for use when the immediate record-engaging part of the armature system—i. e., the "stylus"—is of a permanent or semi-permanent type, so that replacement of the armature system is seldom necessary.

The armature system in these figures may comprise a lower portion 32 which is of small-diameter cylindrical form and is held in the resilient block 4, like the needle of earlier figures. Illustrative of the permanent or semi-permanent character of the stylus, this has been shown (relatively enlargedly in the interest of clear illustration) as a spherical jewel or the like 31, appropriately held permanently in the lower extremity of the portion 32. Closely above the resilient block 4 the armature system is widened, in the front-and-back direction of the pick-up device (i. e., parallel to the surface of electrode 9) into the portion 33; this widening may for example be effected by flattening of the material, originally of the cylindrical form of and integral with portion 32, though no unexpressed limitation to this method of formation is intended. At its upper extremity the portion 33 is sharpened to a knife edge 34; and this edge may engage a V-shaped trough 35a provided in a metallic block 35 which is substituted for the metallic block 5 of Figure 1.

The remainder of the pick-up device of Figures 5-6 may be as in Figures 1-4. Among other things, the instant embodiment has some efficiency advantage over the former, in that the vibratable electrode (33) in the oscillatorily variable capacity is now comparable in area to the stationary electrode (9), and that capacity is accordingly larger—not only absolutely, but also relatively to the shunting fixed capacity inherently present between the conductor 13 and the arm A, etc. The armature system is, however, preserved as a unitary member, and the above discussed advantages of such a system are accordingly effectively retained.

I have discovered that with pick-up devices of this general type it is possible in a most simple manner to provide a novel and effective type of volume-expanding action. (The broad desirability of a volume-expanding action in reproduction, as a compensation for the volume-compressing action which must usually be employed in recordation, is of course well-known and need not be specially discussed.) It is to be noted, however, that while this novel type of volume-expanding action is especially simply and favorably obtained in pickup devices of the general type already described, it in many aspects transcends the details of those devices.

In general, this volume-expanding action involves the mechanical variation or control of the efficiency of the picking up—typically, of the translation of the vibrations of the armature system—in accordance with appropriate characteristics of the record groove undulations. This action is in distinction to the usual volume-expanding action involving electrical control of the translated oscillations by those oscillations themselves—a control requiring considerable special apparatus, and always involving a slight delay or time lag in its action.

In typical records the approximate characteristic of the groove undulations according to which a volume-expanding action should be controlled is the "velocity-constant," or the product of the frequency and amplitude of the undulations. This is so because of the approximately uniform-velocity basis on which recordation is typically carried out over a large part of the audible spectrum—a basis which involves the recordation with similar velocity-constants of sounds of equal intensities.

I have observed that the "drag" of the record groove on the stylus traversing it—i. e., the force tending to carry the stylus along with the moving record, out of its normal relationship to the rest of the pick-up device—is roughly proportional to the velocity-constant of the groove undulations being traversed by the stylus. This is true since in all curves having similar velocity constants, whatever the frequencies may be, there is found similarity of angle of intercept of the curve with its axis, similarity of curve length for given axis length, etc.—and since these characteristics of angle, length etc. are those which give rise to and determine the degree of the drag (over and above a minimum drag component which would characterize a non-undulating groove). Accordingly I have observed that a control of efficiency of picking up, in approximate accordance with the drag of the record groove on the stylus, will provide a desirable volume-expanding action.

A measure of or a response to the variable drag of the record groove on the stylus is to be found, in structures wherein the armature system is resiliently held as to movement in the direction of the record groove, in the displacement of the armature in that direction from its normal position—i. e., from its rest position, or more precisely from the position it occupies when traversing a non-undulating groove. In the structures already described the armature system is so resiliently held by the resilient block 4 (in addition to its resilient holding as to side-to-side or vibratory movement). For example in Figure 4, wherein the record movement may be taken as downward, the needle 6 will be displaced downwardly from the illustrated position to a degree corresponding to the drag of the record groove on the needle point or stylus. To secure a desirable volume-expansion I may therefore control the efficiency of the picking up in approximate accordance with this variable displacement of the armature system in the groove direction by the groove undulations. Specifically, I may so control the efficiency of the translation of the vibration of the armature system. A structure for doing this has been illustrated in Figurue 7, which is to be taken as supplemented by Figures 1-4 excepting for the single feature of modification which Figurue 7 illustrates.

This feature is the twisting or angling of the lower portion of spring or electrode 9 (designated as 9' in Figure 7) so that in a forward direction (i. e., in that toward which the record R is moving, as indicated by the arrow) the surface of the electrode 9' diagonally approaches a vertical plane passing through the record groove being traversed by the needle 6 (while remaining, vertically, substantially parallel with the needle). An accompanying pure detail of desirable modification may be a slight re-shaping of the insulating pad 10 to the form appearing as 10' in Figure 7, to still present to the screw 8 a surface substantially normal to the screw axis.

In considering the action of the structure it is convenient to bear in mind that the efficiency of the translating system and action is dependent on the spacing of the armature or needle, in its mean position as to side-to-side vibration, from the electrode 9'; that at any one spacing the translating action will take place according to a frequency characteristic predetermined as a satisfactory one by appropriate choice of the components of the associated electrical circuit means; and that in general this frequency characteristic will not be substantially altered by alterations of the mean inter-electrode spacing, whose effect is essentially to alter the efficiency of the translation uniformly at all frequencies.

If the needle is traversing a non-undulating groove such as I illustrated in Figure 8, there will be a minimum drag on the needle, and its position and spacing from electrode 9' may be taken as those illustrated in Figure 7. If the needle is traversing a groove with medium velocity-constant, such as II illustrated (in greatly exaggerated form) in Figure 8, there will be a medium drag on the needle; its mean position, when viewed as in Figure 7, will be somewhat lower than illustrated and therefore nearer the electrode 9', and the efficiency of the translating system and action will be somewhat increased. If the needle is traversing a groove with high velocity-constant, such as III illustrated (in greatly exaggerated form) in Figure 8, there will be a large drag on the needle; its mean position, when viewed as in Figure 7, will be considerably lower than illustrated and therefore considerably nearer the electrode 9', and the efficiency of the translating system and action will be much increased.

Grooves II and III illustrate undulations of the same frequency, but of different amplitudes and hence of different velocity-constants. Curve III—a is presented as an illustration (correspondingly exaggerated) of undulations of lower frequency than but of the same velocity-constant as those of groove III. It will accordingly be understood that if the needle is traversing groove III—a, the drag on and resulting displacement of the needle, and the attendant effect on the translating efficiency, will be essentially similar to those for groove III. It will of course be understood that the position of the electrode 9' will be adjusted by the screw 8 to preserve a dependable failure of contact of the armature or needle 6 therewith under conditions of the needle traversing the highest velocity-constant undulations likely to be encountered.

Various features of my invention are not limited to an electrostatic translating system such as those which have thus far been described. Furthermore, they are capable of being embodied with translating systems operating on a "push-pull" basis—i. e., wherein the armature system approaches a respective one of two sensitive portions as it moves in each of its two opposite vibratory directions, and influences these portions in respectively opposite senses. To illustrate a typical alternative form of translating system, and also a transmitting system operating on a push-pull basis, I have included in the drawings the Figures 9 through 11. Herein the translating system is of an electromagnetic type.

In these figures the bottom closure member, made of non-magnetic material, appears as 42, positioned in the bottom of a casing 1 which may be provided and supported as in earlier figures. In the bottom member 42 there is provided a recess in which is held a resilient block to serve the function of the block 4 of earlier figures. By way of alternative illustration, and for purposes hereinafter apparent, this recess has been shown as a rectangular recess 43 cut upwardly from the bottom of the member 42, and having its larger dimension in a front-and-back direction (typically extending from front to back of the member 42). In this recess is fitted the resilient block 44, for example of material similar to that above discussed for the block 4. By way of alternative example of means for holding the resilient block in place, there has been shown secured against the bottom of the member 42 a plate 41. In the center of the plate 41, and in the center of the member 42 above the recess 43, are respective circular holes 41a and 42a, for example of diameter just a little less than the side-to-side dimension of the recess 43.

On top of the member 42 are secured righthand and lefthand pole-pieces 47 of magnetic material. These may have a front-and-back dimension only a fraction of, and disposed in the center of, that of the member 42; each may extend from substantially its respective side of the casing nearly to the center. Resting on the outer top portions of the pole-pieces 47 may be the inverted U-shaped magnet 48; purely by way of example, the entire assembly of 41, 42, 47 and 48 has been shown secured together by screws 49 threaded into the respective legs of the magnet. Extending substantially across the space between the legs of the magnet in a side-to-side direction, substantially from the front to the back of the casing 1 in a front-and-back direction, and from the tops of the pole pieces almost up to the horizontal central portion of the magnet, may be a coil 50 having a central bore 50a. The coil may be held in place in any convenient manner, for example by the expanding tendency of a resilient washer 51 compressed between the top of the coil and the horizontal central portion of the magnet. In the center of the bottom of this portion of the magnet there may be provided a concave conical bearing 45. The more sharply conical top of a needle 46 may engage this bearing, the needle extending downwardly therefrom through the bore 50a of the coil, between the pole pieces 47, and through the resilient block 44 to terminate in the usual record-engaging point or other stylus arrangement at its lower extremity.

The general mounting, and the insertability and removability of the needle, will be recognized as similar to Figure 1. Also similar to that figure is the use of the needle to constitute the entire armature system, with the advantages already noted for a unitary such system. In this instance, of course, the needle will serve to carry a variable magnetic flux; accordingly it is made of a magnetic material, preferably selected for high permeability. Any tendencies of the needle to saturate may in the last analysis be guarded against by appropriately controlling the strength of the magnet 48; even a considerable loss of efficiency resulting from this practise may well be tolerated, in view of the relatively high efficiency which the magnetic translating systems normally tend to have, and of the ease of compensating for such a loss by appropriate increase of degree of amplification of the output of the device.

It will be understood that as the armature or needle 46 is vibrated by the groove undulations toward a first of the pole-pieces, there will be built up in the needle a magnetic flux in a first direction, and that as the needle vibrates away from that pole-piece this flux will die away; this action is in itself sufficient to produce in the needle an oscillatory flux variation corresponding to the groove undulations. This action is, however, augmented, and tendencies to harmonic generation balanced out, by the push-pull action—the building up of a flux in the opposite direction as the first flux dies away, and so on in an always-aiding manner. And it will be understood that the oscillatory flux variation in the armature or needle will cause the generation in the surrounding coil 50 of a corresponding alternating voltage. This may of course be amplified, controlled and translated into sound by such a cascade as 19—20—21—22 of Figure 1.

The volume-expansion action above described may be incorporated in the pick-up device of Figures 9 through 11, which has accordingly been illustrated as arranged therefor. This may be done by arranging the inner faces 47b of the pole-pieces (which are the sensitive portions of the translating device, alternately approached by the armature) similarly to the electrode 9' in Figure 7—i. e., in planes which, projected forwardly (or in the direction of record movement under the stylus) will intersect a vertical plane passing through the traversed record groove. This is seen in Figure 10. By analogy to the description above presented as to Figure 7, it will be understood that the greater the drag of the record groove on the needle or stylus, the narrower the gap in which the needle or armature vibrates, the closer its mean spacing to each pole-piece, and the higher will be the efficiency of translation or picking up.

There may here be mentioned a few considerations common to such structures as those of Figure 7 and Figure 10. One is the dependence of the degree of volume expansion on the angle selected for the face of the sensitive portion (9' or 47b). It will be understood that the more the angular deviation of this face from parallelism with the vertical plane passing through the traversed record groove, the greater will be the degree of the volume-expanding action. An adjustment of this angle may be made in the structure of Figure 7 by the simple expedient of bending the spring 9'. An adjustment may be made in the structure of Figure 10, within limits, by rotating the pole-pieces about the screws 49. (The holes 47a in the pole-pieces through which the screws 49 pass have been shown as slightly oversize, to permit precise spacing adjustment for any of a variety of angular relationships so established.)

Another of the mentioned considerations is the further dependence of the degree of volume-expanding action on the compliance of the resilient block (4 or 44) in the direction of the traversed record groove. This may of course be controlled by selection of the thickness and/or the material of the block, and/or of the dimension in the just-mentioned direction. The first two of these three parameters of course also influence the compliance as to vibratory movement of the armature, and for a circular block so does the third. The showing of a rectangular block in Figure 10 illustrates the possibility of achieving different compliance values for the vibratory and groove-ward movements of the armature, so that each may be established at a preferred value. In the typically illustrated Figure 10 structure there is of course a greater compliance for the groove-ward movement than for vibratory movement, though this condition may obviously be reversed by appropriate re-arrangement of the rectangle, if and when found desirable.

Still another of the mentioned considerations is the ability, if desired for any special purpose, to employ the illustrated and described principles for volume compression. In this case the face of the sensitive portion of the translating device is simply arranged in a plane which, projected rearwardly (or in the direction opposite to that in which the record is moving under the stylus), intersects the vertical plane passing through the traversed record groove. This may be considered as illustrated in Figures 7 and 10 if the direction of record movement (and of "front" and "back") be considered reversed.

Still another of the mentioned considerations is the observation that the volume-expanding (or -compressing) actions disclosed in connection with either figure are not only obtained by structures of extreme simplicity (involving no extra components over and above those otherwise necessary), but also are characterized by an absence of any noticeable time lag whatever. This, always helpful, is of especial significance in a large number of frequently encountered instances—wherein for full impressiveness the volume-expanding action is called on to emphasize the contrast between immediately consecutive pianissimo and fortissimo tones, or vice versa.

I may finally describe a complete pick-up device embodying some of the more important features of my invention in an especially simple, readily made and easily adjusted construction, which is illustrated in Figures 12 through 14.

Herein appears a heavy, generally cylindrical standard 61, provided at its bottom with a mounting flange 62. Fitting downwardly into and rotatable within the vertical bore of the standard is a supporting tube 63, at the top of which there is provided a shoulder 64 bearing on the top of the standard. From this shoulder there extend upwardly two spaced prongs, one of which appears as 65. Between horizontally aligned pivots on these prongs, one of which pivots appears as 66, there is pivotally mounted a light tube 67 forming an arm for supporting the pick-up device proper. The arm 67 may extend for a short distance rearwardly from the pivots 66 (leftwardly as seen in Figure 12); and in its rear extremity there may if desired be secured an internally threaded collar 68, adjustably threaded into which may be a counterweight 69 for adjustably reducing the pressure of the pick-up on the record. Alternatively or additionally to the collar and counterweight, for adjustably reducing that pressure, there may be secured to the forward surface of the shoulder 64 a leaf spring 70, which extends forwardly to bear up against the arm 67 with a pressure determined by the biasing or tensioning of the spring. It will of course be understood that by the described mounting of the arm 67, its forward extremity is rendered free to move up and down for engagement of a pick-up stylus with the record, and from side to side so that the stylus may track a groove in the record R therebeneath.

Into the forward end portion of the tubular arm 67 there is fitted a cylindrical block 71 of insulating material such as "Bakelite," this block preferably extending for a distance forwardly beyond the arm extremity. Intermediate between the inner end of the block 71 and the outer arm extremity, the arm and block are jointly provided with a vertical hole 72. In the top portion of this hole there is secured a metallic plug 75. This is to be electrically connected with the arm 67; and a convenient manner of automatically providing this connection, and at the same time removably securing the plug in place in the hole and the block 71 in place in the arm 67, is to thread the plug into the hole. The bottom of the plug 75 is provided with a concave conical bearing, designated as 75a.

From side to side across its bottom, before its insertion in the arm 67, there has been cut in the block 71 a "flat" 73; this may extend from somewhat behind to somewhat forward of, and consequently is centrally intersected by, the hole 72. It will be understood that the flat 73 forms, with the tubular arm 67, a recess which is flat on top, rectangular in plan, and arcuate on the bottom. Retained within this recess, and filling the same (excepting permissibly at the very extreme side portions) is a suitably shaped block 74 of resilient material, such for example as abovementioned for the block 4 of Figure 1. Vertically through this block 74 is a small hole in alignment with the bearing 75a abovementioned; and through this hole and into engagement with that bearing there is removably inserted the pointed upper extremity of a needle 76, whose lower extremity will form a stylus to engage the record R therebeneath. It will be understood that the block 74 and bearing 75a cooperate to hold the needle in the same manner as do 4 and 5a of Figure 1. As in the case of prior figures, the bearing may be termed a thrust bearing, and the needle or armature extremity is shaped (as by being more pointed) to engage this bearing and to be freely movable pivotally, within ample limits, about the point or region of its engagement.

From the outer end of the block 71 inwardly, at a vertical level just sufficient to clear the flat 73, and in a side-to-side position of approximate alignment with one side of the hole 72, there is passed a horizontal hole 77. The hole 77 of course partially intersects the hole 72; and it is threaded from its outer extremity inwardly at least as far as the region of this intersection. In the hole 77 there is adjustably threaded a metallic screw 78 having a conical inner extremity 78a. The screw 78 may extend outwardly beyond the end of block 71, and any adjustment of it may be locked by a lock-nut 79 adapted to be tightened against the outer end of the block 71. As will become apparent, this screw 78 forms an operatively stationary electrode for cooperation with the needle as a vibratory electrode is forming an oscillatorily variable capacity. To make electrical connection with the screw 78 there may be clamped underneath the lock-nut 79 a lug 80, and to this lug may be electrically connected a conductor 13. This may be passed through a horizontal hole 81 (which extends lengthwise through the block 71 as close to the axis of the block as is conveniently possible without its intersection of hole 72) into the interior of the arm 67. The conductor 13 may pass lengthwise of this arm (insulated by insulation 13a and centrally positioned as by packing 14, as within the arm A of Figure 1), and then downwardly through shoulder 64, tube 63 and standard 61. Conductor 13, and a conductor 15 connected to the standard 61 (and through above described elements with the needle 76), may then be connected to appropriate associated electrical circuit means, such as illustrated in and described in connection with either Figure 1 or Figure 5.

The surface region of the conical screw end 78a nearest the armature or needle 76 constitutes in this embodiment the sensitive portion of the electrostatic translating system. As best seen in Figure 14, this surface region presents to the needle 76 a surface tapered as are the surfaces 9' of Figure 7 or 47b of Figure 10—one which, projected in the direction of record movement under the stylus, intersects the vertical plane containing the traversed record groove. The resilient block 74 of course yields, and the armature or needle 76 displaces forwardly, in a degree corresponding to the drag of the record groove, bringing the needle correspondingly closer to the stated surface region of the screw end 78a. Accordingly the volume-expanding action above described is obtained with the instant construction. A corresponding volume-compressing action may of course be obtained by reversing the direction of the record movement relative to the structure. The degree of the volume-expanding (or compressing) action may be altered by replacing the screw 78 with a screw having a conical end of different degree of taper.

A cover to protect the exposed end of the block 71, and to act as an electrostatic shield for the exposed outer end of the screw 78, may be provided in the form of a light closed-end cylinder 82, its bore snugly fitting over the cylindrical arm 67. Slotted for the needle 76 so as not to interfere with the vibration thereof (as indicated at 82a), it may be slipped into the position illustrated in Figure 12, with its end slightly spaced from the extremity of screw 78.

The sensitivity of the pick-up device of Figures 12 through 14 tends to be a little poorer than those of earlier figures such as 1 or 5, in view of the restriction of the active surfaces of the electrodes. Offset against this, however, is its extreme simplicity, ease of manufacture, and inherent lightness—the latter reducing to a minimum the necessity for reliance on means to reduce the stylus pressure on the record, and contributing to a desirable minimization of moment of inertia of the device as a whole.

I may point out that with all the disclosed devices it is possible to obtain highly satisfactory reproduction with an extremely light pressure of the stylus on the record. The device illustrated in Figures 12 through 14 has been found, for example, to yield excellent reproduction with a stylus (or needle-point) pressure on the record of a minor fraction of an ounce. Pick-up operation with these light pressures is well recognized as a desideratum—among other things for the purpose of minimizing record wear and, equally importantly, for the purpose of minimizing surface noise without impairing the reproduction of recorded high frequencies. The operability of my devices with these low pressures is markedly contributed to by the unitary natures and inherent lightness of their armature systems. At the same time the sensitivities of the devices are entirely satisfactory, being amply above the level at which tube and other noises generated in the amplifier become noticeable.

In concluding the description of the several embodiments I may mention what I consider to be especially faithful reproduction, amazing freedom from surface noise, and generally favorable action obtained with the device of Figures 12–14 operated, at a stylus pressure on the record of the stated minor fraction of an ounce, with the frequency-modulation circuit of Figure 5.

While I have disclosed my invention in terms of particular embodiments thereof, with various features variously grouped in those embodiments, it will be understood that this has been done in an illustrative rather than in a limitative spirit, and that I intend no unnecessary limitations by reason of the details of those embodiments nor by reason of the particular groupings therein of features otherwise groupable. There will be made apparent by the description to those skilled in the art many modifications, of the details and groupings, which will fall within the spirit of the invention, whose proper scope is intended to be expressed in the appended claims.

I claim:

1. A vibratable electrode for cooperation with the stationary electrode of an electrostatic phonographic pick-up device, comprising a record-engaging needle extending into spaced relationship to, and forming an oscillatorily variable capacity with, said stationary electrode.

2. In a phonographic pick-up device operating by translation of the vibrations of an armature system: the combination of a record-engaging needle comprised in said armature system and having an intermediate portion retained in said device for transverse vibratory movement, and means within said device providing a thrust bearing, the inner extremity of said needle being in thrusting engagement with said bearing.

3. In a phonographic pick-up device operating by translation of the vibrations of an armature system: the combination of a record-engaging needle comprised in said armature system and having an intermediate portion retained in said device for transverse vibratory movement, and means within said device providing a thrust bearing, the inner extremity of said needle being formed for and being in pivotally free engagement with said thrust bearing.

4. An armature system for a phonographic pick-up device which is internally provided with a concave thrust bearing, comprising a needle shaped at one end for engagement with a moving record and pointed at the other end for engagement with said bearing.

5. In a phonographic pick-up device operating by translation of the vibrations of a needle: the combination of a resilient member in the lower portion of said device, apertured to admit and resiliently hold a record-engaging needle; and means in the upper portion of said device providing a freely engageable thrust bearing for the upper end of a needle inserted through and held by said resilient member.

6. In a phonographic pick-up device including an oscillation-translating system: the combination of a record-engaging needle having an intermediate portion retained in said device for vibratory movement transverse to the needle axis and having a portion in spaced relationship to a sensitive portion of said translating system, and means providing a thrust bearing in which the inner extremity of said needle is engaged.

7. In phonographic reproduction, the method of translating electric oscillations from the undulating groove of a moving record, which includes mechanically altering the efficiency of the translation in substantial accordance with characteristics of the groove undulations.

8. In phonographic reproduction, the method of translating electric oscillations from the undulating groove of a moving record, which includes mechanically altering the efficiency of the translation in substantial accordance with the velocity constant of the groove undulations.

9. A phonographic pick-up device for translating electric oscillations from the undulating groove of a moving record, comprising an armature system, including a record-engaging stylus portion, movable within the pick-up device both transversely of and in the direction of the record groove, and translating means differentially responsive during operation of the device to transverse vibrations of the armature system according to the position of the armature system within the device in said groove direction.

10. A phonographic pick-up device for translating electric oscillations from the undulating groove of a moving record, comprising an armature system, including a record-engaging stylus portion, movable within the pick-up device both transversely of and in the direction of the record groove, and translating means having a sensitive portion spaced from and influenced by said armature system during operation of the device and diagonal to said groove direction, whereby the closeness of approach of the armature system to said sensitive portion during transverse armature vibration is dependent on the position of the armature system within the device in the groove direction.

11. In the translation of electric oscillations from the vibrations of a stylus traversing the undulating groove of a moving record, the method of volume expansion or compression which comprises altering the efficiency of the translation in substantial accordance with the drag of the record groove on the stylus.

12. In a phonographic pick-up device, adapted for the translation of electric oscillations from the undulating groove of a moving record, and including vibation-transmitting means: the combination of a stylus adapted to traverse and be vibrated by the groove and to influence the translating means, and means responsive to the drag of the record groove on the stylus for altering the degree of influence of the stylus on the translating means.

13. In a phonographic pick-up device, adapted for the translation of electric oscillations from the undulating groove of a moving record, and including a record-engaging armature system: the combination of translating means actuated, during operation of the device, by vibration of the armature system transverse to the direction of the record groove in a degree responsive to the position of the armature system within the device longitudinally of the groove direction, and resilient means retaining the armature system for both transverse and longitudinal movements within the device.

14. A phonographic pick-up device adapted for installation in the forward end portion of a horizontal tubular arm, comprising a block of insulating material fitting within said arm end portion and provided with an approximately vertical aperture; an armature system, comprising an electrode, resiliently retained within said aperture for side-to-side vibration and for limited front-and-back movement; and a co-operating electrode comprising a screw passing rearwardly from the forward extremity of said block into said aperture and terminating in a conical point in spaced relationship to the side of said first-mentioned electrode.

15. An armature system for a phonographic pick-up device which is internally provided with a thrust bearing, comprising a needle shaped at one end for engagement with a moving record and formed at the other end for essentially freely pivotal engagement with said thrust bearing.

BENJAMIN F. MIESSNER.